UNITED STATES PATENT OFFICE.

CHARLES MOSELEY AND BENJAMIN BLUNDSTONE, OF MANCHESTER, COUNTY OF LANCASTER, ENGLAND; SAID BLUNDSTONE ASSIGNOR TO SAID MOSELEY.

MANUFACTURE AND APPLICATION OF INDIA-RUBBER TIRES, HOOPS, AND BANDS TO WHEELS, &c.

SPECIFICATION forming part of Letters Patent No. 322,391, dated July 14, 1885.

Application filed June 16, 1885. (No model.) Patented in England May 21, 1885, No. 6,251.

*To all whom it may concern:*

Be it known that we, CHARLES MOSELEY and BENJAMIN BLUNDSTONE, subjects of the Queen of Great Britain, residing at Manchester, in the county of Lancaster and Kingdom of Great Britain, have invented certain new and useful improvements in the manufacture and application of india-rubber tires, hoops, and bands to wheels, pulleys, rollers, and similar objects, (patented in Great Britain, May 21, 1885, No. 6,251;) and we do hereby declare the following to be a full, clear, and exact description of the invention, such as will enable others skilled in the art to which it appertains to make and use the same.

Our invention relates to a new method of attaching rubber hoops or tires or other circular bands or rings to wheels, pulleys, rollers, or other circular objects.

The object of our invention is to provide such a method that rubber tires may be secured in their proper position on grooved wheels as effectually as by any other method and in a much simpler and less expensive manner. Heretofore such tires have been thus secured in several different ways, the principal of which are: The rubber tire has been placed upon the wheel and the latter has had a groove made upon itself so as to partially embrace the tire. This method is injurious to the wheel to such an extent that it becomes anything but circular. The rubber tire has been cemented to the wheel. It has been difficult to find a cement which will fasten rubber to a metal. The best cement at present is a practical failure in fastening tires on wheels, because the usage is very rough. The rubber tire has been put on unvulcanized and then vulcanized in its seating. This is a good method theoretically but not practically, because the vulcanized rubber made under such difficulties is not of good quality. The rubber tire has also been secured by bolts, pins, detachable flanges, and by other mechanical clamps, but they all destroy the trueness of similarity of geometrical form and equilibrium. We have experimented upon all these and upon other methods, and we have discovered a method which is so simple, and therefore so desirable to be used by every one, that we wish to be protected by Letters Patent.

As the invention is so simple that it may be easily explained without drawings, even to those not versed in the art, all drawings have been omitted.

In brief, the invention consists, first, in employing a tire of the same size as the wheel, and made of such a rubber compound that when heated to about the boiling-point of water it becomes much more pliable and extensible; and, secondly, in stretching such a tire upon the wheel while in the above-named pliable and extensible condition. After remaining upon the wheel for a short time it contracts and becomes hardened to its natural condition and size, and remains in a secure manner until by rough usage the tire wears out.

The india-rubber compound or mixture of which the tire, hoop, or band, or the hard portion thereof, consists is of such a compound or mixture as will after vulcanization be comparatively hard and rigid, and be capable of being rendered temporarily soft and extensible or compressible by the application of heat. When soft or elastic india-rubber compounds or mixtures are employed in conjunction with the hard compound in the construction of the tire, hoop, or band, such soft compounds or mixtures may be used as are ordinarily employed in the manufacture of india-rubber tires. In such cases the hard and soft constituents of the tire, hoop, or band may occupy any convenient position relative to each other.

The tire, hoop, or band, consisting of the hard or hard and soft compounds, as hereinbefore described, is vulcanized in a mold in the ordinary manner or by other suitable means, and is applied or fixed to the wheel, pulley, roller, or other object after vulcanization in the manner or by the method hereinbefore described.

Suitable india-rubber compounds for the purpose of our invention are well known by manufacturers of india-rubber goods.

We prefer to use as the rubber compound a mixture half and half of vulcanized and soft rubber, but our invention includes the heating of all rubber compounds or mixtures which will become pliable and extensible by said process of heating. The method of heating we prefer is that of placing the tires in boiling water; but, of course, if desired, they may be heated in an oven.

What we claim as our invention, and desire to secure by Letters Patent, is—

1. The method, substantially as hereinbefore described, of securing rubber tires, bands, or hoops to wheels, pulleys, or rollers, said method consisting, first, in heating the rubber tire, band, or hoop until it becomes pliable and extensible, and, secondly, in stretching the said rubber band, tire, or hoop upon the said wheel, roller, or pulley while still in a pliable and extensible condition, substantially as and for the purpose set forth in the annexed specification.

2. The method of manufacturing tires, hoops, or bands composed of india-rubber compounds, said method consisting in employing for the rubber such a mixture or compound as will be capable of being rendered temporarily pliable and extensible, substantially as and for the purpose described.

In testimony whereof we affix our signatures in presence of two witnesses.

CHARLES MOSELEY.
BENJAMIN BLUNDSTONE.

Witnesses:
JOHN MARSHALL,
WILLIAM E. HEYS.